United States Patent
Tsuchiya

(10) Patent No.: US 10,264,148 B2
(45) Date of Patent: Apr. 16, 2019

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Masato Tsuchiya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/459,549

(22) Filed: Mar. 15, 2017

(65) Prior Publication Data

US 2017/0279988 A1   Sep. 28, 2017

(30) Foreign Application Priority Data

Mar. 22, 2016 (JP) .................. 2016-057558

(51) Int. Cl.
| | |
|---|---|
| *H04N 1/00* | (2006.01) |
| *G06F 3/12* | (2006.01) |
| *H04N 1/327* | (2006.01) |
| *H04N 1/32* | (2006.01) |
| *H04W 88/02* | (2009.01) |
| *H04W 88/08* | (2009.01) |

(52) U.S. Cl.
CPC ....... *H04N 1/00477* (2013.01); *G06F 3/1203* (2013.01); *G06F 3/1236* (2013.01); *G06F 3/1292* (2013.01); *G06F 3/1297* (2013.01); *H04N 1/00307* (2013.01); *H04N 1/00315* (2013.01); *H04N 1/00411* (2013.01); *H04N 1/00506* (2013.01); *H04N 1/32507* (2013.01); *H04N 1/32786* (2013.01); *G06F 3/1209* (2013.01); *H04N 2201/0094* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS

| | | | |
|---|---|---|---|
| 6,072,682 A | 6/2000 | Ravanelli et al. | |
| 6,616,262 B2 | 9/2003 | Nakajima et al. | |
| 2008/0037050 A1* | 2/2008 | Sasaki .................. | G06F 13/102 358/1.13 |
| 2011/0173537 A1* | 7/2011 | Hemphill .......... | G06F 17/30038 715/716 |
| 2012/0054353 A1* | 3/2012 | Jung .................... | H04W 88/04 709/227 |
| 2013/0201981 A1* | 8/2013 | Niwa .................. | H04W 76/043 370/338 |
| 2014/0293311 A1* | 10/2014 | Hata .................. | H04N 1/00278 358/1.13 |

(Continued)

FOREIGN PATENT DOCUMENTS

| | | |
|---|---|---|
| JP | 2015-146561 | 8/2015 |
| JP | 2015-212903 | 11/2015 |

*Primary Examiner* — Helen Zong
(74) *Attorney, Agent, or Firm* — Venable LLP

(57) ABSTRACT

On a display unit, a user interface screen including a first acceptance unit configured to, in a case when the information processing apparatus is operating as an access point, accept an end instruction for ending operation as the access point and a second acceptance unit configured to accept a disconnection instruction for disconnecting the connection by the wireless communication with the terminal is displayed.

23 Claims, 10 Drawing Sheets

(56) References Cited

U.S. PATENT DOCUMENTS

| | | | |
|---|---|---|---|
| 2016/0128119 A1* | 5/2016 | Maheshwari | H04W 76/023 |
| | | | 370/329 |
| 2017/0068492 A1* | 3/2017 | Nakamura | G06F 3/1212 |
| 2017/0142767 A1* | 5/2017 | Furubayashi | H04W 76/14 |
| 2017/0180922 A1* | 6/2017 | Nishi | H04W 4/008 |

* cited by examiner

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus capable of wireless communication with a terminal, a control method, and a storage medium for storing a program.

Description of the Related Art

In recent years, many household appliances and office devices have wireless communication functions, and many now connect to the Internet or a LAN within a family home. Also, an increasing number of image forming apparatuses, such as a printer/multifunction peripheral, are wirelessly connected to a mobile terminal/laptop computer, and then a print job is inputted or device settings are performed.

Wireless communication connection configurations are broadly divided into two: a type in which an access point is passed through and a type in which an access point is not passed through. In communication of the type in which the access point is passed through, it is possible for a group of devices that wish to communicate to connect to the same access point, which, for example, corresponds to an infrastructure mode in a Wifi specification. Meanwhile, in communication of the type in which the access point is not passed through, it is possible for the group of devices to directly communicate with each other, which corresponds to WifiDirect which uses P2P communication or a Wifi software AP mode in which one of the group of devices functions as an access point.

Typically, for access points to which wireless devices connect, there exists an upper limit on the number of connections due to a software or hardware restriction. It is necessary that a new terminal connect upon a disconnection of a currently connected terminal in a case when it is impossible to allow a number of devices exceeding such upper limit to connect, and the number of connections is already the maximum.

In Japanese Patent Laid-Open No. 2015-146561, stopping an AP function of a wireless LAN and transmitting a message indicating a disconnection to a terminal is described. In Japanese Patent Laid-Open No. 2015-212903, a UI screen switchable between a mode according to a WifiDirect connection and a mode according to an AP connection is described.

In a case when a new wireless terminal desires to connect when the wireless terminal functioning as the access point has reached its maximum number of connections, a terminal that is currently connected must temporarily disconnect. In Japanese Patent Laid-Open No. 2015-146561, it is necessary to, in a case when the maximum connection number upper limit is reached during access point mode activation, temporarily cause the mode to stop by an explicit access point mode stopping operation. Also, in Japanese Patent Laid-Open No. 2015-212903, it is necessary to disconnect a currently connected wireless terminal by temporarily causing an access point mode to end by switching the mode by a UI operation.

However, when the access point mode is stopped, all terminals including wireless terminals that are being used by users, such as to input jobs or to perform device settings, for example, are disconnected.

SUMMARY OF THE INVENTION

An aspect of the present invention is to eliminate the above-mentioned problems with the conventional technology. The present invention provides an information processing apparatus for appropriately controlling a communication connection with a terminal, a control method, a storage medium for storing a program.

The present invention in one aspect provides an information processing apparatus capable of connecting by wireless communication with a terminal, the apparatus comprising: a first acceptance unit configured to, in a case where the information processing apparatus is operating as an access point, accept an end instruction for ending operation as the access point; a second acceptance unit configured to accept a disconnection instruction for disconnecting the connection by the wireless communication with the terminal; and a display control unit configured to cause a display unit to display a user interface screen including the first acceptance unit and the second acceptance unit.

By virtue of the present invention, it is possible to appropriately control a communication connection with a terminal.

Further features of the present invention will become apparent from the following description of exemplary embodiments with reference to the attached drawings.

DESCRIPTION OF THE EMBODIMENTS

Figure 1:
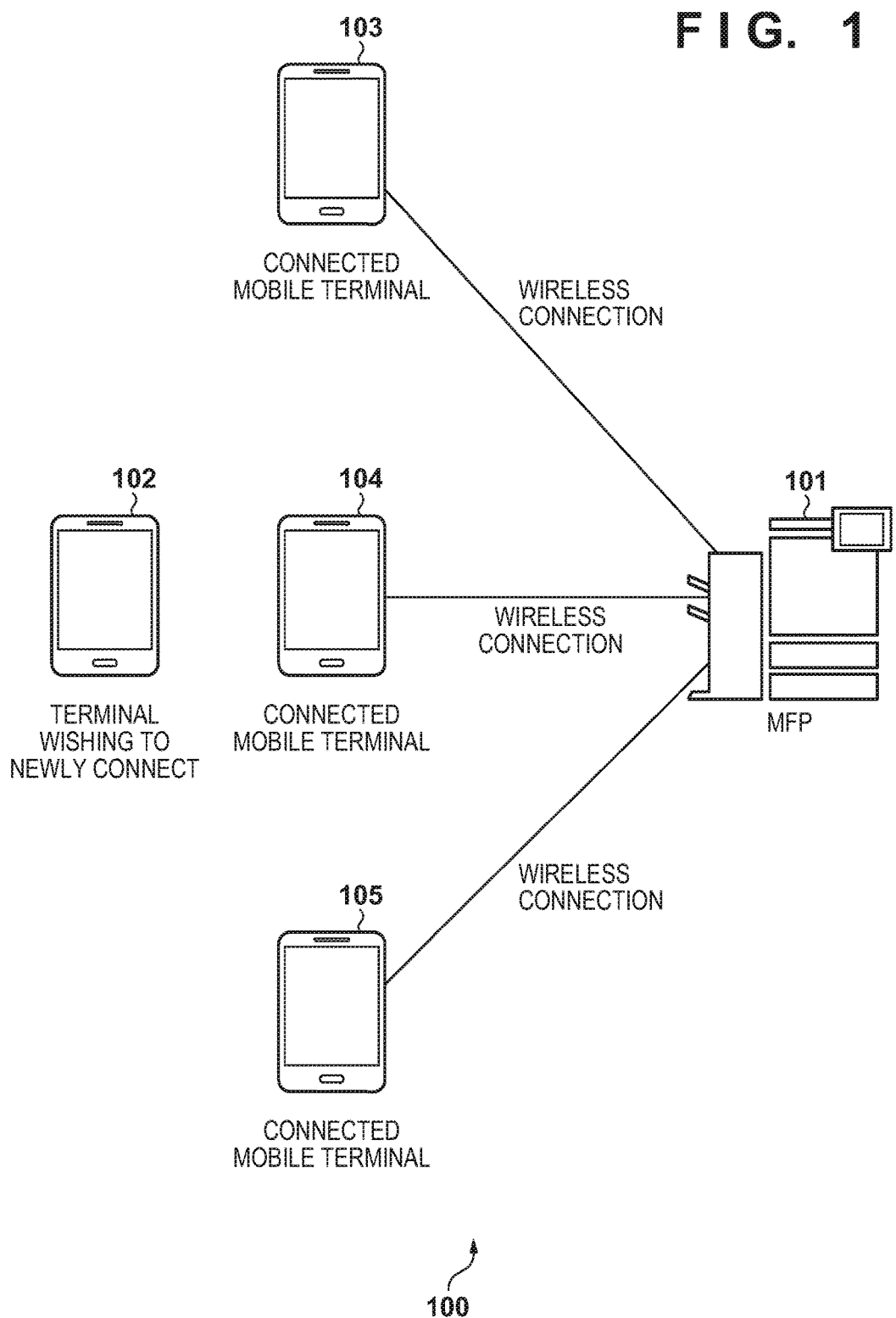
FIG. 1 is a view illustrating a configuration of an information processing system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and description thereof is omitted.

First Embodiment

[System Configuration]

FIG. 1 is a view illustrating a configuration of an information processing system 100 in the present embodiment. The information processing system 100 includes an MFP 101 whose maximum number of connected terminals is three, a mobile terminal 102 which newly attempts to make a wireless connection to the MFP, and mobile terminals 103, 104, and 105 which are already connected to the MFP 101. FIG. 1 illustrates a situation in which three, which is the maximum number of connected terminals, mobile terminals are already connected to the MFP 101, and the mobile terminal 102 which desires to newly connect appears in a state in which no more mobile terminals can connect. Also, in the present embodiment, although description is given with an MFP (image forming apparatus) as an example, it may be a generic information processing apparatus, for example, and it may be a personal computer, a mobile terminal, or the like. In the information processing system 100, the mobile terminal inputs a print job to the MFP 101 and the MFP 101 performs a print to a print sheet based on the print job for example.

[Hardware Configuration of the MFP 101]

Figure 2:
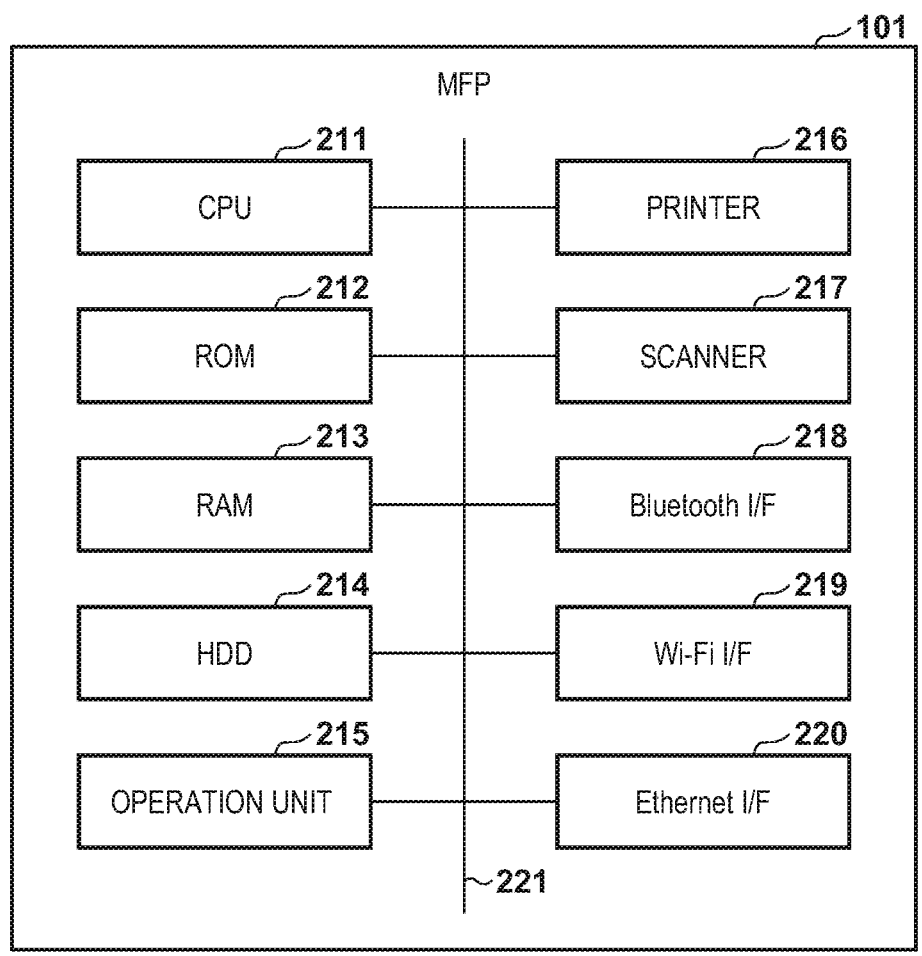
FIG. 2 is a block diagram illustrating a hardware configuration of an MFP.

FIG. 2 is a block diagram illustrating a hardware configuration of the MFP 101. A CPU 211 comprehensively controls operations of the MFP 101 on the whole. For example, the CPU 211 performs various control such as reading control, transmission control, and display control by reading a control program stored in a ROM 212. In the ROM 212, besides programs, data and the like necessary in the present embodiment is stored, for example, display data for a display of a user interface screen in the present embodiment is stored. A RAM 213 is a volatile memory that the CPU 211 uses, for example as a work area for executing various programs. An HDD 214 stores image data, setting data, tables, and various programs. An operation unit 215 includes an LED, hardware keys, a display (display unit) which operates as a touch panel that a user can operate, or the like.

A printer 216 performs a print to a printing medium such as a print sheet based on image data transferred via an internal bus. A scanner 217 generates image data by optically reading an image on an original. A Bluetooth (registered trademark) interface (I/F) 218 is an interface for performing wireless communication by a Bluetooth standard and for performing mutual communication with other devices that have a Bluetooth I/F. In the present embodiment, mutual communication with a mobile terminal (a wireless device) is performed according to a Bluetooth standard. A Wifi I/F 219 and an Ethernet (registered trademark) I/F 220 are NICs (Network Interface Cards) for connecting to a network wirelessly/by wire respectively. The blocks illustrated in FIG. 2 are mutually and communicably connected via an internal bus 221 and perform mutual data exchange.

[Software Configuration of the MFP 101]

Figure 3:
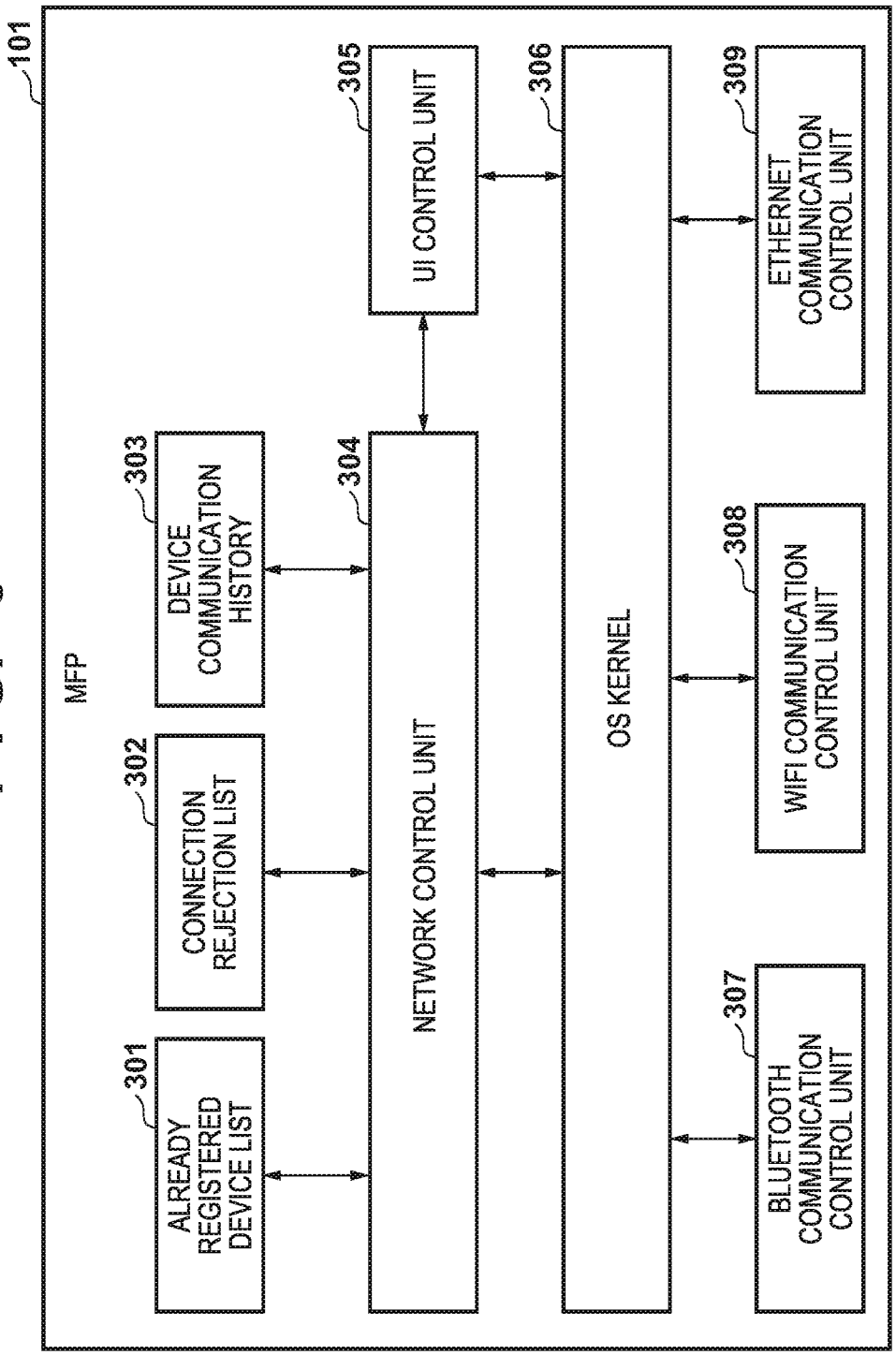
FIG. 3 is a block diagram illustrating a software configuration of the MFP.

FIG. 3 is a block diagram illustrating a software configuration of the MFP 101. A Wifi communication control unit 308 is a module which controls the Wifi communication I/F 219 and a Bluetooth communication control unit 307 is a module which controls the Bluetooth communication I/F 218. Also, an Ethernet communication control unit 309 is a module which controls the Ethernet communication I/F 220. These modules are controlled by an OS kernel 306. A network 304 controls each communication control unit for Bluetooth and Wifi via the OS kernel 306. The network control unit 304 communicates with a user interface (UI) control unit 305, changes a display of a user interface screen, and performs network control in accordance with information from the UI. For example, in the present embodiment, by a detection of a press of a "disconnect" button 741 on a screen 740 of FIG. 7, a communication connection with a mobile terminal is disconnected.

An already registered device list 301 holds set device names for identifying devices connected to the MFP 101. The already registered device list 301, as illustrated in Table 1 for example, is a table in which a set device name (32 byte character sequence) which can be arbitrarily set by a user and a MAC address (48 bit non-negative integer) which is unique to a device are associated. There are also cases when the already registered device list 301 is registered in advance or changed (edited) later by a user (such as a system administrator) for example. The already registered device list 301 is used when a list of connected devices is displayed to the user as with the screen 740 or the screen 750 of FIG. 7 described later. Although a MAC address is used in Table 1 and later described tables, other identification information may be used if a device can be uniquely identified.

TABLE 1

| ALREADY REGISTERED DEVICE LIST | |
|---|---|
| MAC ADDRESS | SET DEVICE NAME |
| AA:AA:AA:AA:AA:AA | MOBILE TERMINAL 103 |
| BB:BB:BB:BB:BB:BB | MOBILE TERMINAL 104 |
| XX:XX:XX:XX:XX:XX | LAPTOP PC X |
| YY:YY:YY:YY:YY:YY | LAPTOP PC Y |

A connection rejection list 302 is a list of MAC addresses of devices for which a connection is currently temporarily rejected, and is a table of a list of the MAC addresses as illustrated in Table 2 for example. A mobile terminal tries to automatically re-connect even if disconnected from the access point side since the mobile terminal saves information relating to a connection destination access point. Accordingly, a device is temporarily registered in the connection rejection list 302 when a disconnection instruction by the "disconnect" button 741 is accepted on the screen 740 of FIG. 7. For a mobile terminal corresponding to a MAC address registered in the connection rejection list 302, a connection request from the mobile terminal by a saved SSID and PSK for Wifi authentication will be rejected by the MFP 101, and it will not be able to connect to the MFP 101. In the present embodiment, the MAC address from the connection rejection list 302 is deleted and a state in which a connection request of the mobile terminal will be accepted by the MFP 101 when a particular time elapses or when a condition that a "permit" button 751 of the screen 750 is pressed is satisfied.

TABLE 2

| CONNECTION REJECTION LIST | |
|---|---|
| | MAC ADDRESS |
| 1 | AA:AA:AA:AA:AA:AA |
| 2 | ZZ:ZZ:ZZ:ZZ:ZZ:ZZ |

A device communication history 303 is a list which holds a last communication time of a connected mobile terminal and is a table in which MAC addresses and last communication times are associated as illustrated in Table 3 for example. The device communication history 303 holds a MAC address of a currently connected mobile terminal and a last communication time of the mobile terminal. By the device communication history 303, it is possible to provide to a user information which will become determination criteria when selecting a mobile terminal (a mobile terminal for which it can be determined that the probability of there not being a problem even if disconnected is high) that can be determined to be the most unused.

TABLE 3

DEVICE COMMUNICATION HISTORY

| | MAC ADDRESS | LAST COMMUNICATION TIME |
|---|---|---|
| 1 | BB:BB:BB:BB:BB:BB | DATE: TIME |
| 2 | CC:CC:CC:CC:CC:CC | DATE: TIME |

[Flow in which a Display of a Disconnection Button of the MFP 101 is Performed]

Figure 4:
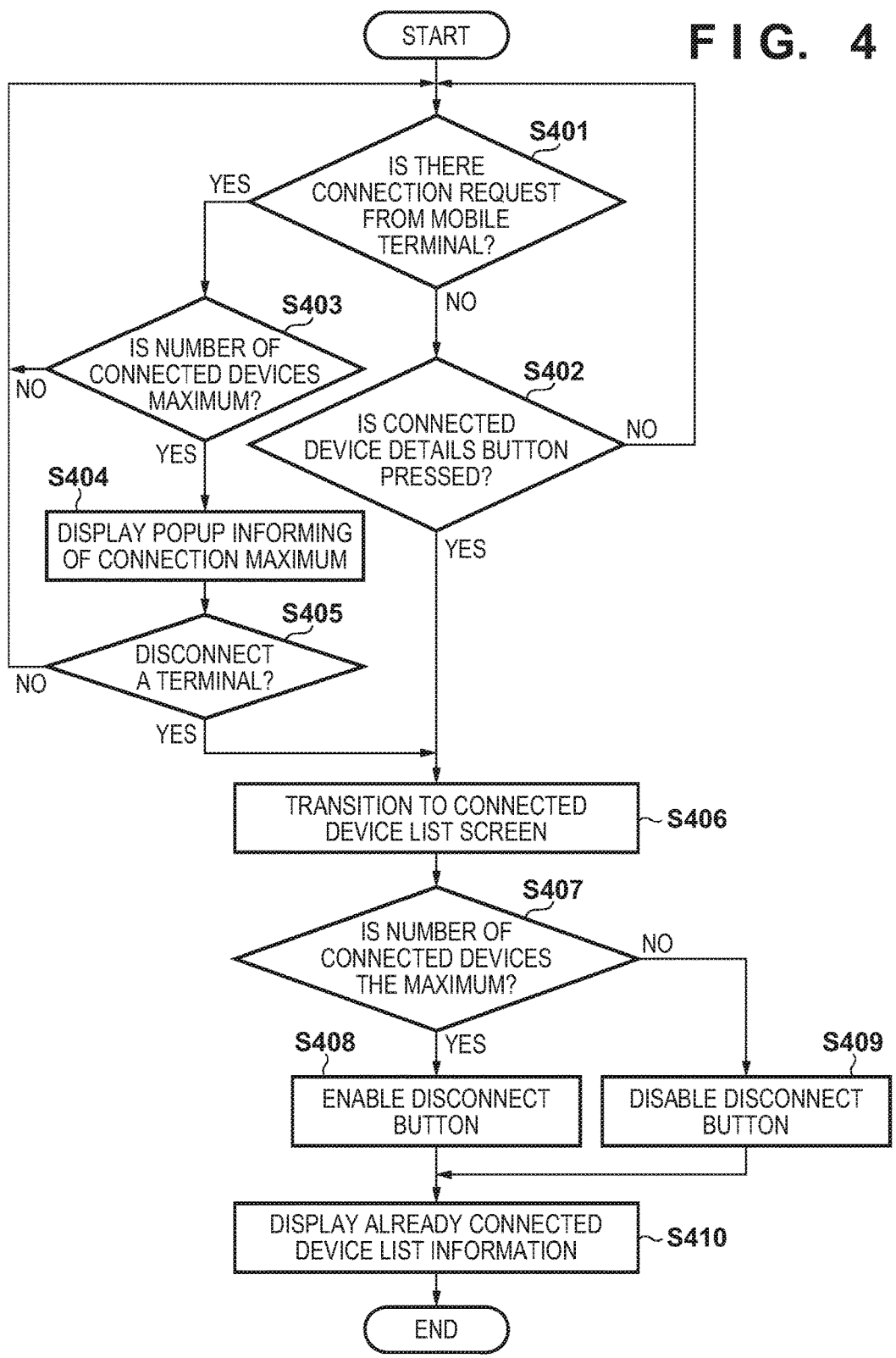
FIG. 4 is a flowchart illustrating processing up until a disconnection operation of a mobile terminal is performed.

FIG. 4 is a flowchart illustrating processing in which the MFP 101 starts a function as a wireless access point (hereinafter referred to as an access point) upon a start button 711 on the screen 710 of FIG. 7 being pressed, and the function continues until a disconnection operation of a mobile terminal is performed thereafter. Each process of FIG. 4 is realized by the CPU 211 loading a program that is stored in the memory of the ROM 212 or the like to the RAM 213 and executing the program for example. Hereinafter, description of FIG. 4 is given with reference to FIG. 7.

The CPU 211 waits for a connection request from a mobile terminal after starting the function as an access point (step S401). At that time, a screen 720 is displayed when the start button 711 of the screen 710 of FIG. 7 is pressed. In a case when it is determined in step S401 that there is a connection request, the CPU 211 determines whether or not the number of current connections is the maximum (upper-limit value) (step S403). Here, in a case when it is determined that the number is the maximum, the screen 730 of FIG. 7 pop-up displays on the operation unit 215 (step S404).

In the present embodiment as illustrated in the screen 730, a message saying "No more wireless devices can be connected. Would you like to disconnect a currently connected device?" is displayed. As a result, it is possible to entrust to a user a determination of whether or not to disconnect a mobile terminal that is not in use for example, and connect a new mobile terminal.

The CPU 211 determines whether on the screen 730 "YES" button 731 is pressed or a "NO" button is pressed, specifically, whether or not to accept an instruction for performing a disconnection of a currently connected mobile terminal (step S405). The CPU 211 displays to the operation unit 215 the connected devices screen 740 of FIG. 7 in a case when the "YES" button 731 is pressed (step S406). Meanwhile, a pop-up display of the screen 730 is cancelled and the processing from step S401 repeats in a case when a "NO" button 732 is pressed.

In step S402, the CPU 211 determines whether or not a connected device details button 721 on the screen 720 is pressed by the user in a case when it is determined that there is no connection request in step S401. In step S406 the CPU 211 displays to the operation unit 215 the connected devices screen 740 in a case when it is determined that the connected device details button 721 is pressed here.

In step S406, the CPU 211 determines whether or not the number of current connections is the maximum when the screen 740 is displayed (step S407). The CPU 211 enables and displays the "disconnect" button 741 of the screen 740 of FIG. 7 in a case when it is determined that the number of connections is the maximum here (step S408). Meanwhile, the "disconnect" button 741 is disabled and displayed in a case when it is determined that the number is not the maximum (step S409). Here, to disable means to restrict such that an operation by a user cannot be accepted and to display in a hatched display for example. Alternatively, configuration may also be taken such that a display of the "disconnect" button 741 is not performed in step S409.

In step S410, the CPU 211 displays to the user connected device information as illustrated in the screen 740 (step S410). After step S410, the processing of FIG. 4 ends. Note that configuration may also be taken such that the CPU 211 sorts connected devices in order of oldest last communication time for example in the screen 740 by referencing the device communication history 303 and displays them to the screen 740. By such a configuration, it is possible to cause the usability of a disconnection operation of a user to improve. Also, in FIG. 4, the "disconnect" button 741 is enabled and displayed only in a case when the number of connections is the maximum. However, configuration may also be taken such that the CPU 211 determines whether or not mobile terminals which have not been used in a predetermined time period based on the last communication time are above a predetermined number for example, and enables and displays the "disconnect" button 741 even if the number of connections is not the maximum when it is determined that there are. Also, configuration may be taken such that a display of the "disconnect" button 741 is disabled and displayed or not displayed in a case when it is determined that the mobile terminals are not at least the predetermined number. By such a configuration, it is possible to cause a reduction in situations in which a mobile terminal whose chance of being used is low is left connected together with connecting the mobile terminal 102 which desires to newly connect.

[Flow After a Disconnection of the MFP 101]

Figure 5:
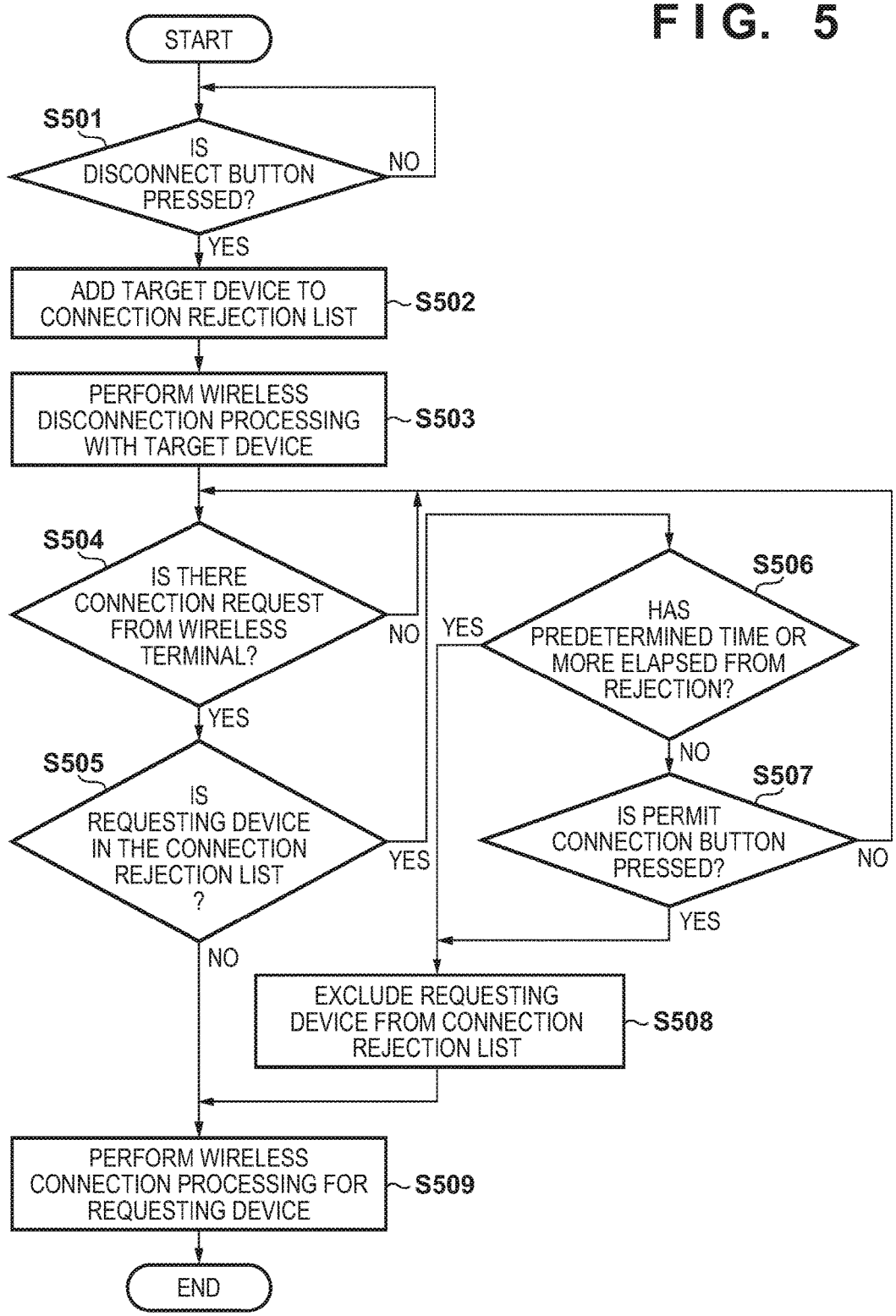
FIG. 5 is a flowchart illustrating processing for after the disconnection operation of the mobile terminal is performed.

FIG. 5 is a flowchart illustrating processing for disconnecting a wireless connection with a mobile terminal upon the "disconnect" button 741 on the screen 740 being pressed. Each process of FIG. 5 is realized by the CPU 211 loading a program that is stored in the memory of the ROM 212 or the like to the RAM 213 and executing the program for example.

When the screen 740 displayed, the CPU 211 determines whether or not the "disconnect" button 741 is pressed (step S501). Here, the processing of step S501 repeats in a case when it is determined that the "disconnect" button 741 was not pressed. The CPU 211 adds a MAC address of a pressed target device to the connection rejection list 302 (step S502) and executes wireless disconnection processing with the device (step S503) in a case when it is determined that the "disconnect" button 741 is pressed.

In step S504, the CPU 211 waits for a connection request from the mobile terminal. Here, the processing of step S504 repeats in a case when it is determined that there is no connection request. The CPU 211 determines whether or not a mobile terminal, for which a request for a connection is determined, is in the connection rejection list 302 in a case when it is determined that there is a connection request (step S505). Here, the CPU 211 determines whether or not a predetermined time (one minute for example) has elapsed for a mobile terminal for which it is determined that there is a request for a connection in a case when it is determined that the mobile terminal is in the connection rejection list. Here, the predetermined time is an elapsed time (one minute for example) from a point in time in which a mobile terminal is registered in the connection rejection list 302 for example. In step S508, the CPU 211 deletes the MAC address of the mobile terminal for which it is determined that there is the request for a connection from the connection rejection list 302 in a case when it is determined that the predetermined time has elapsed. Meanwhile, step S507 is advanced to in a case when it is determined that the predetermined time has not elapsed.

In step S507, the CPU 211 determines whether or not the "permit" button 751 of the screen 750 is pressed. Here, step S508 is advanced to in a case when it is determined that the "permit" button 751 is pressed. Meanwhile, the processing of step S504 repeats in a case when it is determined that the "permit" button 751 was not pressed. The CPU 211 makes a wireless connection with the mobile terminal from which the connection was requested in a case when it is determined in step S505 that the mobile terminal is not in the connection rejection list 302 or after the processing of step S508 (step S509).

Note that in the present embodiment, configuration may also be taken such that a result of an authentication failure is returned to a mobile terminal in a case when it is determined that the "permit" button 751 is not pressed in step S507.

[Flow of Processing of the Whole System]

Figure 6:
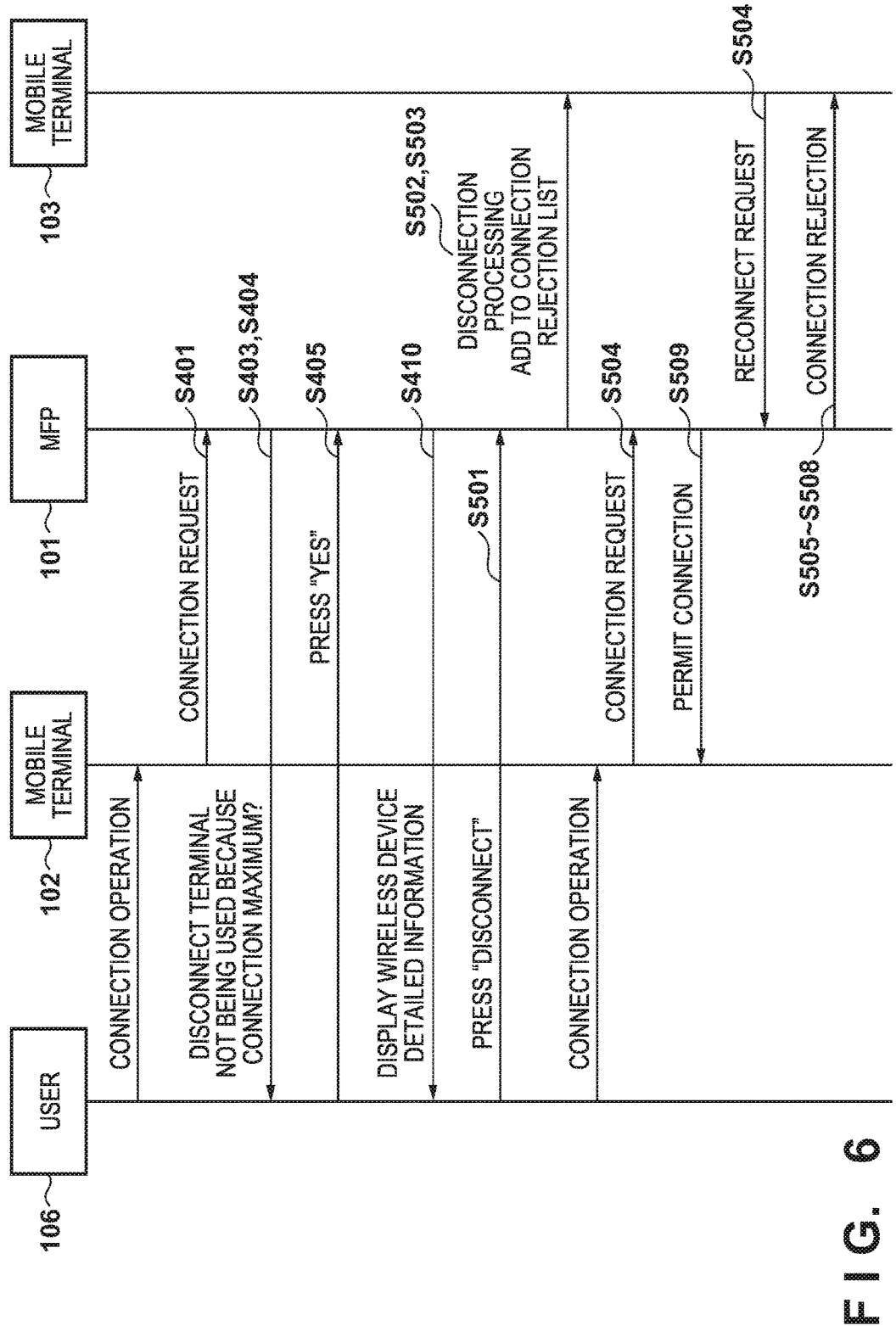
FIG. 6 is a sequence diagram of the information processing system.

FIG. 6 is a sequence diagram in which an overview of a flow of FIG. 4 and FIG. 5 focuses on a mutual relationship of the mobile terminals 102 and 103, the MFP 101, and the user 106. In FIG. 6, similarly to the situation of FIG. 1, is a situation in which mobile terminals of the maximum connection number are already connected, and a new mobile terminal 102 is further attempting to connect. The mobile terminal 103 is one example of a mobile terminal which is already connected.

A user operates the mobile terminal 102 to transmit a connection request to the MFP 101 after the MFP 101 starts a function as a wireless access point (corresponding to step S401). The screen 730 of FIG. 7 is displayed on the MFP 101 in a case when the number of connections of mobile terminals has already reached the maximum (corresponding to step S403 and step S404). The screen 740 is displayed in a case when the user presses the "YES" button 731 of the screen 730 (corresponding to step S405) and the MFP 101 displays to the user detailed information of the connected mobile terminals (corresponding to step S410).

In a case when the user presses the "disconnect" button 741 of the screen 740 (corresponding to step S501) the MFP 101 registers a selected mobile terminal 103 in the connection rejection list 302 and executes disconnection processing (corresponding to step S503). After this, when a connection request from the new mobile terminal 102 is performed again by the user (corresponding to step S504), connection processing with the MFP 101 is performed because the new mobile terminal 102 is not registered in the connection rejection list 302 (corresponding to step S509). Meanwhile, the mobile terminal 103 automatically transmits a request for a re-connection to the MFP 101 because a connection destination is saved within the apparatus itself (corresponding to step S504). However, a connection is rejected as long as the conditions of step S506 and step S507 are not satisfied because the mobile terminal 103 is registered in the connection rejection list 302 (corresponding to step S505 through step S508).

Figure 7:
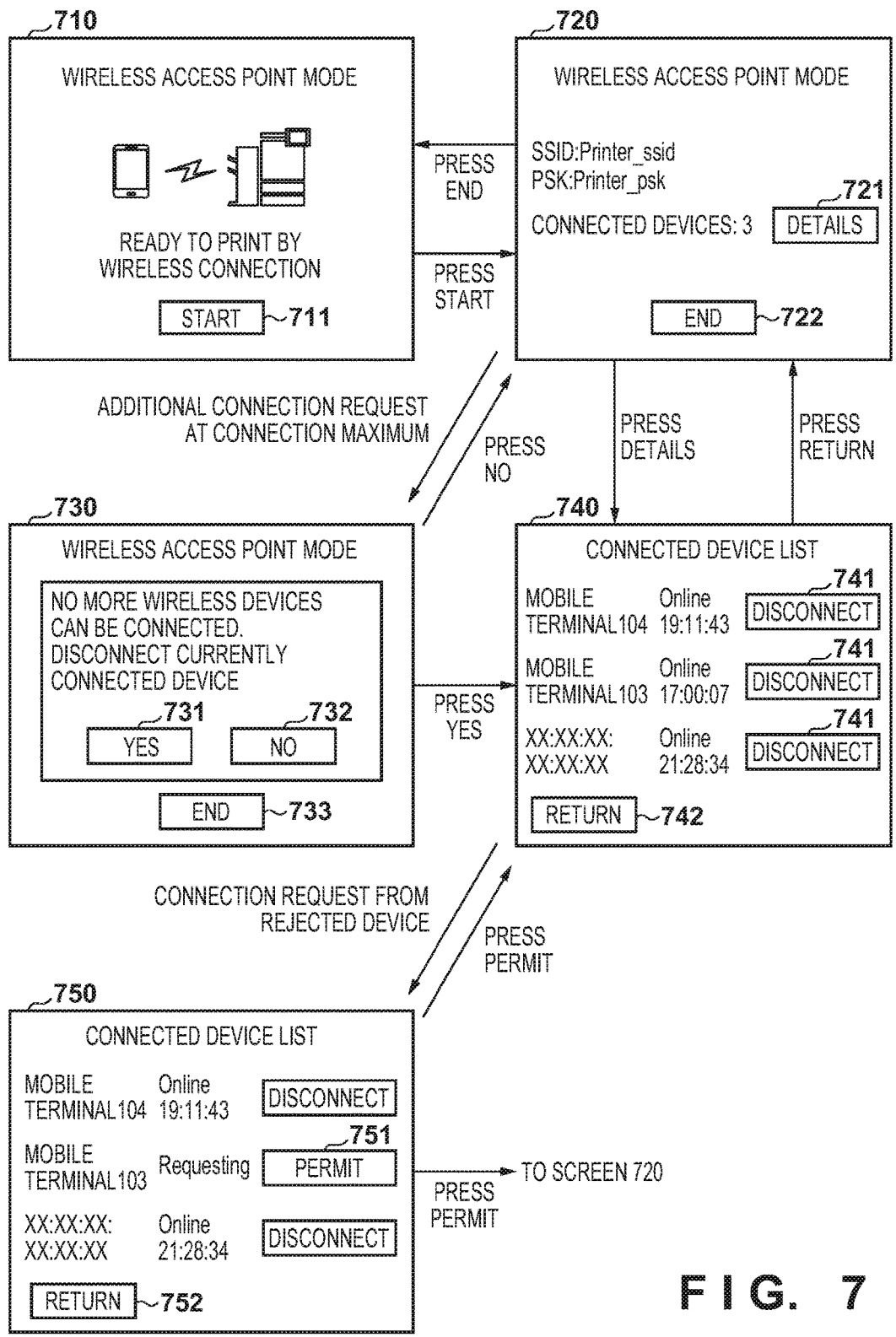
FIG. 7 is a view illustrating transitions of user interface screens of the MFP.

FIG. 7 is a view illustrating transitions of user interface screens for operating the access point mode of the MFP 101. The screen 710 is an initial operation screen of the access point mode. The user makes an instruction for a start of the access point mode by pressing the "start" button 711. When the access point mode enters an operational state, a transition from the screen 710 to the screen 720 is made. The screen 720 displays to the user the current number of connections and information as the access point. The disconnection of connections with all mobile terminals and ending of the access point mode is performed and the screen 710 is returned to when the "end" button 722 of the screen 720 is pressed and an end instruction is accepted. The user can operate the mobile terminal to connect to the MFP 101 if the state of the screen 720 is entered.

A transition is made from the screen 720 to the screen 730 and it becomes to possible to accept whether or not a disconnection of a currently connected mobile terminal is performed when a connection request from a mobile terminal is received in a state in which the maximum number of connections is reached. A transition from the screen 730 to the connected devices list screen 740 is made in a case when the "YES" button 731 is pressed by the user. The screen 720 is returned to in a case when the "NO" button 732 is pressed. Also, a transition is made to the screen 740 upon the "details" button 721 on the screen 720 being pressed.

Whether or not the number of connections is the maximum is determined whether the transition be from the screen 720 or from 730, and the "disconnect" button 741 is enabled and displayed in a case when the number is determined to be the maximum and the "disconnect" button 741 is disabled and displayed in a case when the number is determined to not be the maximum. If a connected mobile terminal is registered in the already registered device list 301, the screen 740 displays the registered name thereof, and if not registered, a MAC address ("XX:XX:XX:XX:XX:XX" on the screen 740 and 750) is displayed. Also, a communication history and a state of communication with the MFP 101 of each device are displayed, attaching the respective registered name and MAC address. By such a configuration, it is possible to provide to the user material for determining whether or not there will be no problem even if disconnected.

The screen 720 is transitioned to in a case when a "return" button 742 is pressed. A transition is made from the screen 740 to the screen 750 when a request for a re-connection is received from a device disconnected via the screen 740. In FIG. 7, a case in which the mobile terminal 103 is disconnected and a request for a re-connection is received from the mobile terminal 103 is illustrated. For example, if the user mistakenly presses the "disconnect" button 741, connections become rejected for a predetermined period. Thus, in the present embodiment, the mobile terminal 103 line is displayed after changing from the "disconnect" button 741 to the "permit" button 751. Configuration is taken such that the MAC address of the mobile terminal 103 is deleted from the connection rejection list 302 and, once again, connection with the mobile terminal 103 becomes possible when a permission instruction is accepted upon the user pressing the "permit" button 751. The screen 720 is returned to in a case when the "return" button 752 of the screen 750 is pressed.

As described above, by virtue of the present embodiment, it is possible to perform control of a wireless communication connection or disconnection for every mobile terminal, on an access point side, specifically, the side of the MFP 101 of FIG. 1. By such a configuration, it is possible to prevent a disconnection of a connection of all mobile terminals including mobile terminals that are in use because an operation as an access point mode is ended in the MFP 101 in a case when a new mobile terminal attempts to connect when the number of connections is the maximum.

Second Embodiment

Hereinafter, description is given regarding points that are different than the first embodiment, in a second embodiment. Although the software configuration of the MFP 101 is the same as in the first embodiment, FIG. 7 is described as FIG. 10, the screen 740 is described as a screen 1020, and the screen 750 as a screen 1040.

[Flow in which a Display of a Disconnection Button of the MFP 101 is Performed]

Figure 8:
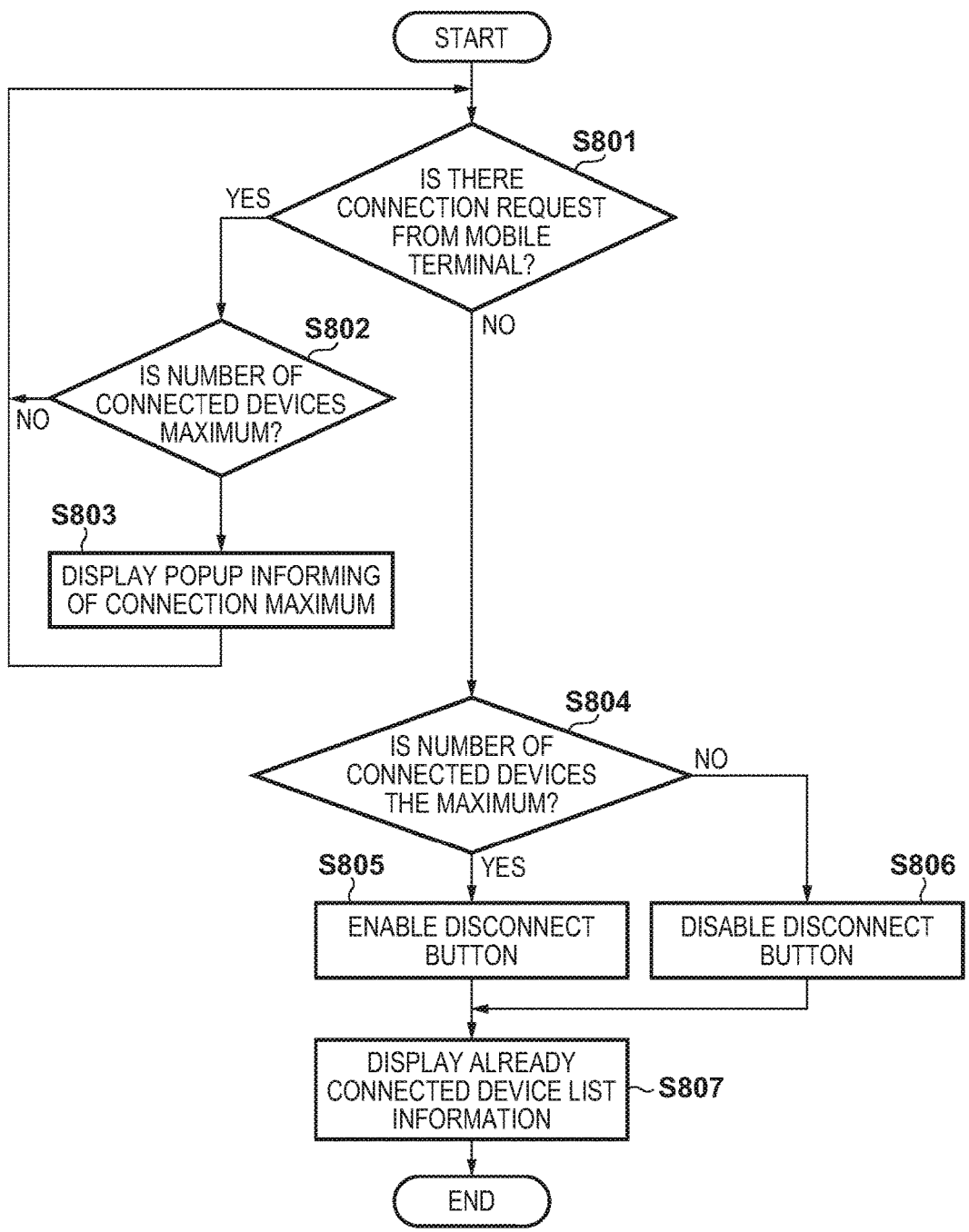
FIG. 8 is a flowchart illustrating processing up until a disconnection operation of a mobile terminal is performed.
Figure 10:
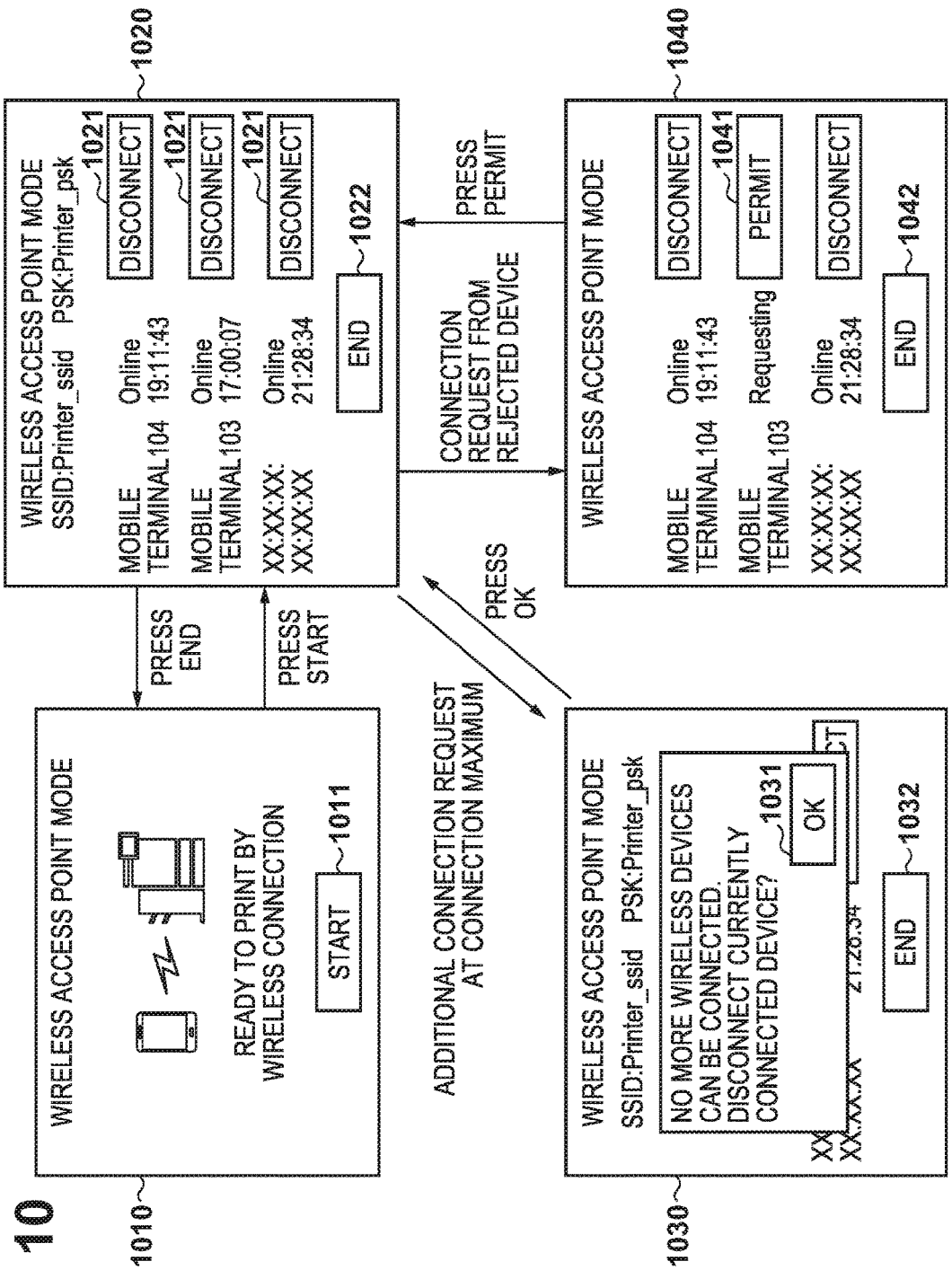
FIG. 10 is a view illustrating transitions of user interface screens of the MFP.

FIG. 8 is a flowchart illustrating processing in which the MFP 101 starts a function as an access point upon a start button 1011 on a screen 1010 of FIG. 10 being pressed and that continues up until a disconnection operation of a mobile terminal is performed thereafter. Each process of FIG. 8 is realized by the CPU 211 loading a program that is stored in the memory of the ROM 212 or the like to the RAM 213 and executing the program for example. Hereinafter, description of FIG. 8 is given with reference to FIG. 10.

The CPU 211 waits for a connection request from a mobile terminal after starting the function as an access point (step S801). At that time, the screen 1020 is displayed when the start button 1011 of the screen 1010 of FIG. 10 is pressed.

In a case when it is determined in step S801 that there is a connection request, the CPU 211 determines whether or not the number of current connections is the maximum (upper-limit value) (step S802). Here, in a case when it is determined that the number is the maximum, the screen 1030 of FIG. 10 pop-up displays on the operation unit 215 (step S803). The screen 1020 is returned to and the processing from step S801 repeats when an "OK" button 1031 of the screen 1030 is pressed.

In a case when it is determined in step S801 that there is no connection request, the CPU 211 determines whether or not the number of connections is the maximum (upper-limit value) (step S804). The CPU 211 enables and displays a "disconnect" button 1021 of the screen 1020 of FIG. 10, which is for accepting a disconnection instruction, in a case when it is determined that the number of connections is the maximum here (step S805). Meanwhile, the "disconnect" button 1021 is disabled and displayed in a case when it is determined that the number is not the maximum (step S806). The CPU 211 displays the screen 1020 based on the processing result of step S805 or step S806 (step S807). Also, a list of connected device information combined with "disconnect" buttons 1021 is displayed as illustrated in the screen 1020.

Note that configuration may also be taken such that the CPU 211 sorts connected devices in order of oldest last communication time for example in the screen 1020 by referencing the device communication history 303 and displays them to the screen 1020. By such a configuration, it is possible to cause the usability of a disconnection operation of a user to improve. Also, in FIG. 8, the "disconnect" button 1021 is enabled and displayed only in a case when the number of connections is the maximum. However, configuration may also be taken such that the CPU 211 determines whether or not mobile terminals which have not been used in a predetermined time period based on the last communication time are above a predetermined number for example, and enables and displays the "disconnect" button 1021 even if the number of connections is not the maximum when it is determined that there are. Also, configuration may be taken such that a display of the "disconnect" button 1021 is disabled and displayed or not displayed in a case when it is determined that the mobile terminals are not at least the predetermined number. By such a configuration, it is possible to cause a reduction in situations in which a mobile terminal whose chance of being used is low is left connected together with connecting the mobile terminal 102 which desires to newly connect.

[Flow of Processing of the Whole System]

Figure 9:
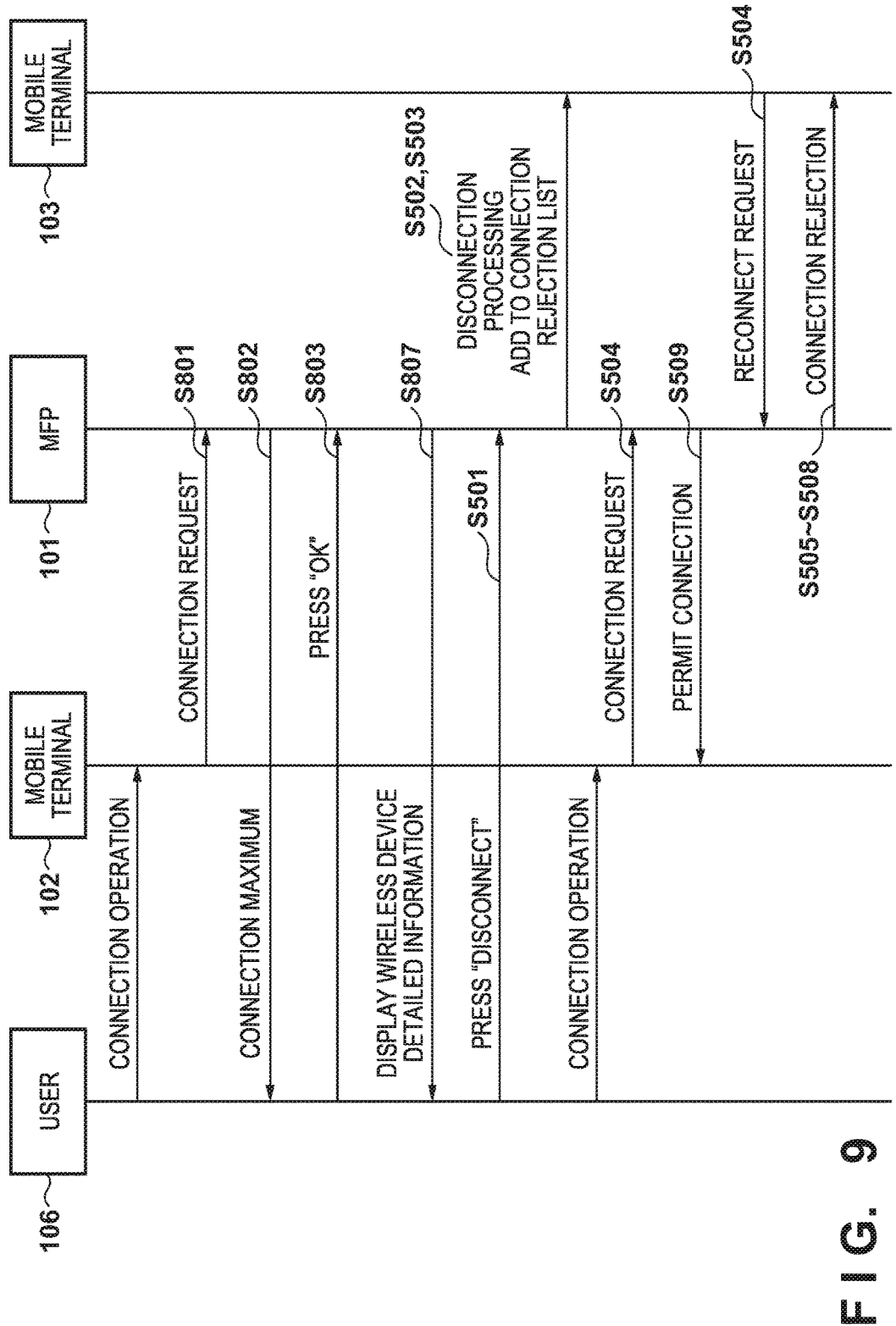
FIG. 9 is a sequence diagram of the information processing system.

FIG. 9 is a sequence diagram in which an overview of a flow of FIG. 5 and FIG. 8 focuses on a mutual relationship of the mobile terminal 102, the MFP 101, and the user 106. In FIG. 9, similarly to the situation of FIG. 1, is a situation in which mobile terminals of the maximum connection number are already connected, and a new mobile terminal 102 is further attempting to connect. The mobile terminal 103 illustrates one example of a mobile terminal which is already connected.

A user operates the mobile terminal 102 to transmit a connection request to the MFP 101 after the MFP 101 starts a function as a wireless access point (corresponding to step S801). The screen 1030 of FIG. 10 is displayed on the MFP 101 in a case when the number of connections of mobile terminals has already reached the maximum (corresponding to step S802 and step S803). The screen 1020 is returned to when the "OK" button 1031 of the screen 1030 is pressed by the user.

In a case when the user presses the "disconnect" button 1021 of the screen 1020 (corresponding to step S501) the MFP 101 registers a selected mobile terminal 103 in the connection rejection list 302 and executes disconnection processing (corresponding to step S503). After this, when a connection request from the new mobile terminal 102 is performed again by the user (corresponding to step S504), connection processing with the MFP 101 is performed because the new mobile terminal 102 is not registered in the connection rejection list 302 (corresponding to step S509). Meanwhile, the mobile terminal 103 automatically transmits a request for a re-connection to the MFP 101 because a connection destination is saved within the apparatus itself (corresponding to step S504). However, a connection is rejected as long as the conditions of step S506 and step S507 are not satisfied because the mobile terminal 103 is registered in the connection rejection list 302 (corresponding to step S505 through step S508).

FIG. 10 is a view illustrating transitions of user interface screens for operating the access point mode of the MFP 101. The screen 1010 is an initial operation screen of the access point mode. The MFP 101 starts an operation of the access point mode upon the user pressing a "start" button 1011. When the access point mode enters an operational state, a transition from the screen 1010 to the screen 1020 is made. The screen 1020 displays to the user list information of the current connected mobile terminals and information of the access point. The disconnection of connections with all mobile terminals and the ending of the access point mode is performed and the screen 1010 is returned to when the "end" button 1022 in the screen 1020 is pressed and an end instruction is accepted.

In the present embodiment, a button for ending the access point mode and a "disconnect" button for disconnecting a communication connection of a respective mobile terminal are displayed on the same screen as illustrated in the screen 1020. By such a configuration, it is possible to end the access point mode and to selectively perform a disconnection of a communication connection of each mobile terminal without ending the access point mode.

The user can operate the mobile terminal to connect to the MFP 101 if the state of the screen 1020 is entered. The screen 1030 is transitioned to and a message that the maximum number of connections is reached is displayed when a connection request is further received in a state in which the maximum number of connections is reached. The screen 1020 is returned to when the "OK" button 1031 is pressed by the user. Note, an "end" button 1032 is disabled while the screen 1030 is pop-up displayed. Whether or not the number of connections is the maximum is determined when the screen 1020 is displayed, and the "disconnect" button 1021 is enabled in a case when the number is determined to be the maximum and the "disconnect" button 1021 is disabled and in a case when the number is determined to not be the maximum. The screens 1020, 1030, and 1040 display a registered name if a connected mobile terminal is registered to the already registered device list 301. Also, a MAC address is displayed if the mobile terminal is not registered ("XX:XX:XX:XX:XX:XX" of the screens 1020, 1030, and 1040). Also, a communication history and a state of communication with the MFP 101 of each device are displayed, attaching the respective registered name and MAC address. By such a configuration, it is possible to provide to the user material for determining whether or not there will be no problem even if the communication connection is disconnected.

A transition is made from the screen 1020 to the screen 1040 when a request for a re-connection is received from a device disconnected via the screen 1020. In FIG. 10, a case in which the mobile terminal 103 is disconnected and a request for a re-connection is received from the mobile terminal 103 is illustrated. For example, if the user mistakenly presses the "disconnect" button 1021, connections become rejected for a predetermined period. Thus, in the present embodiment, the mobile terminal 103 line is displayed after changing from the "disconnect" button 1021 to the "permit" button 1041. Configuration is taken such that the MAC address of the mobile terminal 103 is deleted from the connection rejection list 302 and, once again, connection with the mobile terminal 103 becomes possible when a permission instruction is accepted upon the user pressing the "permit" button 1041. Disconnection of connections with all mobile terminals and ending of the access point mode is performed and the screen 1010 is returned to upon an "end" button 1042 of a screen 1040 being pressed, similarly to with the "end" button 1022 of the screen 1020.

As described above, by virtue of the present embodiment, it is possible to perform control of a wireless communication connection or disconnection for every mobile terminal on an access point side, specifically, the side of the MFP 101 of FIG. 1. By such a configuration, it is possible to prevent a disconnection of a connection of all mobile terminals including mobile terminals that are in use because an operation as an access point mode is ended in the MFP 101 in a case when a new mobile terminal attempts to connect when the number of connections is the maximum. In the present embodiment, a button for ending the access point mode and "disconnect" buttons for disconnecting a communication connection of a respective mobile terminal are displayed on the same screen. By such a configuration, it is possible to end the access point mode and to selectively perform a disconnection of a communication connection of each mobile terminal without ending the access point mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-057558, filed Mar. 22, 2016, which is hereby incorporated by reference herein in its entirety.

What is claimed is:

1. An image forming apparatus serving as a wireless access point, comprising:

a display device configured to display information; and at least one controller configured to:

cause the display device to display a list screen, wherein, in the list screen, a client of which a connection to the wireless access point is established is listed and a client is able to be designated to cancel an established connection to the wireless access point; and in a case where the number of clients of which a connection to the wireless access point is established is a predetermined number, cause the display device to display a notification screen to a user according to receiving from another client a request for establishing a connection to the wireless access point, and in a case where the number of clients of which a connection to the wireless access point is established is not the predetermined number, establish a connection with the another client to the wireless access point according to receiving the request, without causing the display device to display a notification screen to a user, wherein the notification screen includes an selective object for transition to the list screen.

2. The image forming apparatus according to claim 1, wherein the list screen includes a selective object for cancelling each established connection to the wireless access point of all clients.

3. The image forming apparatus according to claim 1, wherein the list screen includes identification information of each client.

4. The image forming apparatus according to claim 3, wherein the identification information is sorted based on communication history information.

5. The image forming apparatus according to claim 1, wherein the list screen includes communication history information of each client.

6. The image forming apparatus according to claim 1, wherein the controller further configured to:
cause the display device to display a specific screen including a specific selective object; and
according to selecting the specific selective object in the predetermined situation, cause the display device to display a screen in which an instruction to designate from a list a client of which a connection to the wireless access point is to be cancelled is enabled, and, according to selecting the specific selective object in a situation different from the predetermined situation, cause the display device to display a screen in which the instruction is disabled.

7. The image forming apparatus according to claim 1, further comprising a printer device configured to form an image on a sheet, wherein the printer device forms the image based on print data transmitted from an external apparatus via a wireless communication.

8. The image forming apparatus according to claim 1, wherein the at least one controller further configured to:
cause the display device to display another screen in which SSID information of the wireless access point is arranged.

9. The image forming apparatus according to claim 1, wherein the at least one controller further configured to:
cause the display device to display another screen in which the number of clients of which a connection to the wireless access point is established is arranged.

10. The image forming apparatus according to claim 1, wherein client information corresponding to a selective object designated in the list screen is stored in a connection rejection list.

11. The image forming apparatus according to claim 10, wherein the at least one controller further configured to:
cause the display device to display another screen in which an instruction for removing the client information from the connection rejection list is enabled.

12. An image forming apparatus serving as a wireless access point, comprising:
a display device configured to display information; and
at least one controller configured to:
cause the display device to display a list screen, wherein, in the list screen, a client of which a connection to the wireless access point is established is listed and an instruction for designating a client from a list a client of which an established connection to the wireless access point is to be cancelled; and
in a case where the number of clients of which a connection to the wireless access point is established is a predetermined number, cause the display device to display a notification message according to receiving from another client a request for establishing a connection to the wireless access point, and in a case where the number of clients of which a connection to the wireless access point is established is not the predetermined number, establish a connection with the another client to the wireless access point according to receiving the request, without causing the display device to display a notification message to a user, wherein the notification message is a message for prompting a user of the instruction.

13. The image forming apparatus according to claim 12, wherein the list screen includes a selective object for cancelling each established connection to the wireless access point of all clients.

14. The image forming apparatus according to claim 12, wherein the list screen includes identification information of each client.

15. The image forming apparatus according to claim 14, wherein the identification information is sorted based on communication history information.

16. The image forming apparatus according to claim 12, wherein the list screen includes communication history information of each client.

17. The image forming apparatus according to claim 12, wherein the controller further configured to:
cause the display device to display a specific screen including a specific selective object; and
according to selecting the specific selective object in the predetermined situation, cause the display device to display a screen in which an instruction to designate from a list a client of which a connection to the wireless access point is to be cancelled is enabled, and, according to selecting the specific selective object in a situation different from the predetermined situation, cause the display device to display a screen in which the instruction is disabled.

18. The image forming apparatus according to claim 12, further comprising a printer device configured to form an image on a sheet, wherein the printer device forms the image based on print data transmitted from an external apparatus via a wireless communication.

19. The image forming apparatus according to claim 12, wherein the at least one controller further configured to:
cause the display device to display another screen in which SSID information of the wireless access point is arranged.

20. The image forming apparatus according to claim 12, wherein the at least one controller further configured to:
cause the display device to display another screen in which the number of clients of which a connection to the wireless access point is established is arranged.

21. The image forming apparatus according to claim 12, wherein client information corresponding to a selective object designated in the list screen is stored in a connection rejection list.

22. The image forming apparatus according to claim 21, wherein the at least one controller further configured to:
cause the display device to display another screen in which an instruction for removing the client information from the connection rejection list is enabled.

23. A control method executed in an image forming apparatus which comprises a display device configured to display information and serves as a wireless access point, the method comprising:
causing the display device to display a list screen, wherein, in the list screen, a client of which a connection to the wireless access point is established is listed and a client is able to be designated to cancel an established connection to the wireless access point; and causing, in a case where the number of clients of which a connection to the wireless access point is established is a predetermined number, the display device to display a notification screen to a user according to receiving from another client a request for establishing a connection to the wireless access point, and establishing, in a case where the number of clients of which a connection to the wireless access point is established is not the predetermined number, a connection with the another client to the wireless access point according to receiving the request without causing the display device to display a notification screen to a user, wherein the notification screen includes an selective object for transition to the list screen.

* * * * *